(12) United States Patent
Onabe et al.

(10) Patent No.: US 10,093,133 B2
(45) Date of Patent: Oct. 9, 2018

(54) PNEUMATIC TIRE

(71) Applicant: BRIDGESTONE CORPORATION, Chuo-ku, Tokyo (JP)

(72) Inventors: Yutarou Onabe, Tokyo (JP); Naoto Oda, Tokyo (JP); Akane Miyoshi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 11 days.

(21) Appl. No.: 14/916,184

(22) PCT Filed: Aug. 21, 2014

(86) PCT No.: PCT/JP2014/071910
§ 371 (c)(1),
(2) Date: Apr. 25, 2016

(87) PCT Pub. No.: WO2015/033793
PCT Pub. Date: Mar. 12, 2015

(65) Prior Publication Data
US 2016/0272011 A1    Sep. 22, 2016

(30) Foreign Application Priority Data
Sep. 4, 2013  (JP) .................................. 2013-183320

(51) Int. Cl.
*B60C 11/03* (2006.01)
*B60C 11/13* (2006.01)

(52) U.S. Cl.
CPC ...... *B60C 11/0332* (2013.01); *B60C 11/0304* (2013.01); *B60C 11/1376* (2013.01);
(Continued)

(58) Field of Classification Search
CPC ............. B60C 11/0332; B60C 11/0304; B60C 11/1376; B60C 11/1392; B60C 11/0083; B60C 11/1384
See application file for complete search history.

(56) References Cited

U.S. PATENT DOCUMENTS

| 5,690,761 A * | 11/1997 | Masaoka | ................. B60C 11/11 152/209.5 |
| 7,478,657 B2 * | 1/2009 | Shida | ................. B60C 11/0083 152/209.15 |

(Continued)

FOREIGN PATENT DOCUMENTS

| EP | 1074405 A1 | 2/2001 |
| EP | 2151333 A1 | 2/2010 |

(Continued)

OTHER PUBLICATIONS

JP03246104 machine translation https://www4.j-platpat.inpit.go.jp/eng/tokujitsu/tkbs_en/TKBS_EN_GM101_Top.action.*

*Primary Examiner* — Jodi C Franklin
(74) *Attorney, Agent, or Firm* — SOLARIS Intellectual Property Group, PLLC (57) ABSTRACT

A tread section is formed with plural circumferential direction main grooves extending around a tire circumferential direction, and is formed with a first rib and a second rib between the plural circumferential direction main grooves. The first rib and the second rib are formed with first arc shaped faces that have arc shapes about centers within the ribs. The first rib and the second rib are also formed with second arc shaped faces that are respectively formed continuously to the first arc shaped faces, and that are have smaller radius of curvature than the first arc shaped faces.

2 Claims, 6 Drawing Sheets (52) U.S. Cl.
CPC ..... *B60C 11/1392* (2013.01); *B60C 2011/039* (2013.01); *B60C 2011/0341* (2013.01); *B60C 2011/0381* (2013.01); *B60C 2011/0386* (2013.01)

(56) References Cited

U.S. PATENT DOCUMENTS

| | | | | |
|---|---|---|---|---|
| 2007/0289684 | A1* | 12/2007 | Nonaka | B60C 11/01 152/209.18 |
| 2009/0205763 | A1* | 8/2009 | Ebiko | B60C 9/22 152/209.5 |
| 2011/0061780 | A1* | 3/2011 | Mita | B60C 11/1392 152/209.8 |
| 2015/0290978 | A1* | 10/2015 | Katsuno | B60C 11/1369 152/209.15 |

FOREIGN PATENT DOCUMENTS

| | | | | |
|---|---|---|---|---|
| JP | H03-246104 | A | 11/1991 | |
| JP | 2001287510 | * | 10/2001 | ............. B60C 11/04 |
| JP | 2010-58781 | A | 3/2010 | |
| JP | 2012-017008 | A | 1/2012 | |
| JP | 2012-116410 | A | 6/2012 | |

* cited by examiner

PNEUMATIC TIRE

TECHNICAL FIELD

The present invention relates to a pneumatic tire, and in particular, a pneumatic tire with a tread pattern in which plural circumferential direction main grooves are formed extending around a tire circumferential direction.

BACKGROUND ART

Existing pneumatic tires sometimes have a specified tire fitting direction, and a tread pattern is asymmetrical about a tire equatorial plane (see Patent Document 1). In particular, in pneumatic tires fitted to high performance vehicles with a high engine output, land portions formed in the tread are set with high rigidity. When land portions have high rigidity, ground contact load concentrates at edges of the land portions, and it becomes difficult to make the high block rigidity function effectively during braking. In particular, in high performance vehicles such as described above, there are demands for improved cornering performance, thereby necessitating suppression of ground contact load concentration at land portion edges.

Patent Document 1: Japanese Patent Application Laid-Open (JP-A) No. 2010-58781

SUMMARY OF INVENTION

Technical Problem

In consideration of the above circumstances, an object of the present invention is to provide a pneumatic tire capable of suppressing ground contact load from concentrating at land portion edges when cornering.

Solution to Problem

A pneumatic tire according to a first aspect of the present invention includes a plurality of circumferential direction main grooves that are formed at a tread section and that extend around a tire circumferential direction; a land portion that is formed between the plurality of circumferential direction main grooves; first arc shaped faces that are formed at both tire width direction edges of the land portion, and that have an arc shape about a center within the land portion as viewed in a tire radial direction cross-section; and an outer second arc shaped face that is formed at an edge on a fitted tire outer side of the land portion, that is formed continuously from the first arc shaped face toward a tire width direction outer side of the land portion and toward a groove bottom, and that has an arc shape, about a center within the land portion as viewed in the tire radial direction cross-section, having a smaller radius of curvature than the first arc shaped face.

In the pneumatic tire according to the first aspect, both tire width direction edges of the land portion are formed with the first arc shaped faces about a center within the land portion. This thereby enables a reduction in ground contact load concentration at the land portion edges.

Note that the fitted tire inner side refers to the inner side (vehicle inner side) in the tire width direction when the tire is fitted to a vehicle. The fitted tire outer side refers to the outer side (vehicle outer side) in the tire width direction when the tire is fitted to a vehicle. The land portion is a portion of the tread section demarcated by grooves, and encompasses ribs and blocks.

The pneumatic tire according to the first aspect is formed with the first arc shaped faces, and is also formed with the outer second arc shaped face at the edge on the fitted tire outer side, formed continuously from the first arc shaped face toward the outer side of the land portion and toward the groove bottom, and having a smaller radius of curvature than the first arc shaped face. This thereby enables a reduction in the volume of the fitted tire outer side edge, thereby enabling ground contact load to be suppressed from concentrating at the land portion edge when cornering.

In a pneumatic tire according to a second aspect of the present invention, an inner second arc shaped face is formed at a fitted tire inner side of the land portion so as to be continuous from the first arc shaped face toward the tire width direction outer side of the land portion and toward a groove bottom, and having an arc shape about a center within the land portion as viewed in the tire radial direction cross-section; and, as viewed in the tire radial direction cross-section, a radius of curvature of the inner second arc shaped face is smaller than the radius of curvature of the first arc shaped face and is the radius of curvature of the outer second arc shaped face or smaller.

Forming the inner second arc shaped face at the fitted tire inner side of the land portion in this manner enables a concentration of load at the fitted tire inner side edge of the land portion to be suppressed when driving straight ahead, or when turning with light steering in cases in which the tire is fitted with a high negative camber. The curvature of the inner second arc shaped face is the radius of curvature of the outer second arc shaped face or lower, thereby configuring a comparatively large drop-off amount on the fitted tire outer side, where a larger load is input when cornering. This thereby enables uneven balance of ground contact pressure in the land portion to be suppressed.

In a pneumatic tire according to a third aspect of the present invention, a tire radial direction drop-off amount from a tread face of the land portion to a lower end of the outer second arc shaped face is a tire radial direction drop-off amount from the tread face of the land portion to a lower end of the inner second arc shaped face or greater.

According to above configuration, the volume of the fitted tire outer side edge is smaller than the volume at the fitted tire inner side. This thereby enables ground contact load to be suppressed from concentrating at the land portion edges when cornering, and enables uneven balance of ground contact pressure in the land portion to be suppressed.

Advantageous Effects of Invention

As described above, a pneumatic tire of the present invention is capable of suppressing ground contact load from concentrating at land portion edges when cornering.

BRIEF DESCRIPTION OF DRAWINGS

FIG. 2-1 is an opened-out view of a tread of a pneumatic tire according to the present exemplary embodiment.

FIG. 2-2 is a partial cross-section taken along line C-C in FIG. 2-1.

DESCRIPTION OF EMBODIMENTS

Explanation follows regarding a pneumatic tire 10 according to a first exemplary embodiment of the present invention, with reference to the drawings. In the drawings, the arrow IN indicates the inner side (referred to below as the "fitted tire inner side") when the tire is fitted to a vehicle (referred to below as "when the tire is fitted"), and the arrow OUT indicates the outer side (referred to below as the "fitted tire outer side") when the tire is fitted to a vehicle. The single-dotted intermittent line CL indicates a tire equatorial plane.

Figure 1:
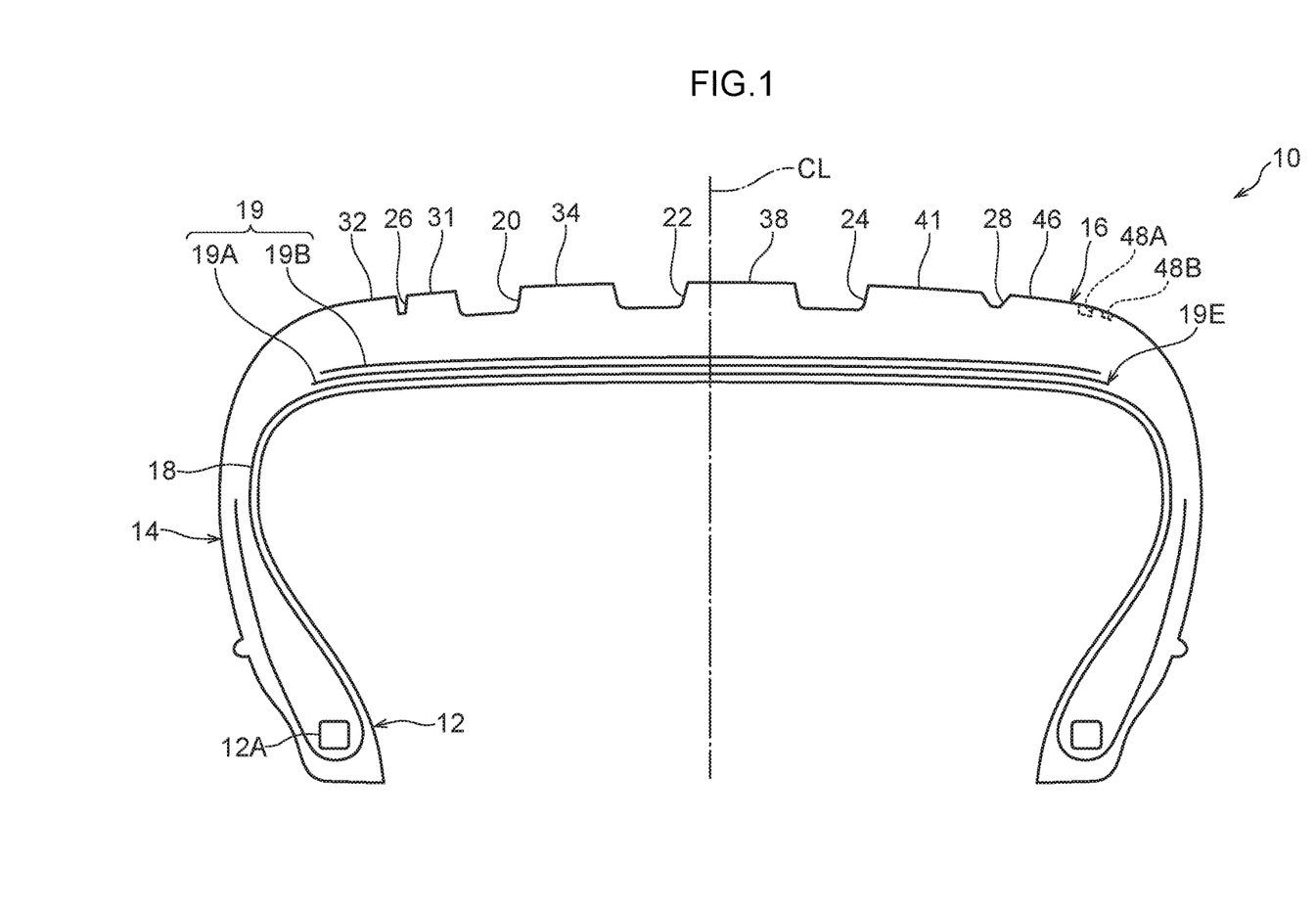
FIG. 1 is a tire radial direction cross-section of a pneumatic tire according to an exemplary embodiment.

As illustrated in FIG. 1, the pneumatic tire 10 of the present exemplary embodiment includes a pair of bead sections 12, a pair of side wall sections 14, and a tread section 16. At least one ring shaped bead core 12A is embedded in each bead section 12. A carcass 18 is provided so as to straddle the pair of bead cores 12A in a toroidal shape. The carcass 18 wraps around the bead cores 12A from the inner side to the outer side. Belt layers 19 are provided at a tire radial direction outer side of the carcass 18. The belt layers 19 are configured by two belt layers, and include a first belt layer 19A disposed at the outer side of the carcass 18, and a second belt layer 19B disposed as a layer on the outer side of the first belt layer 19A.

Figure 21:
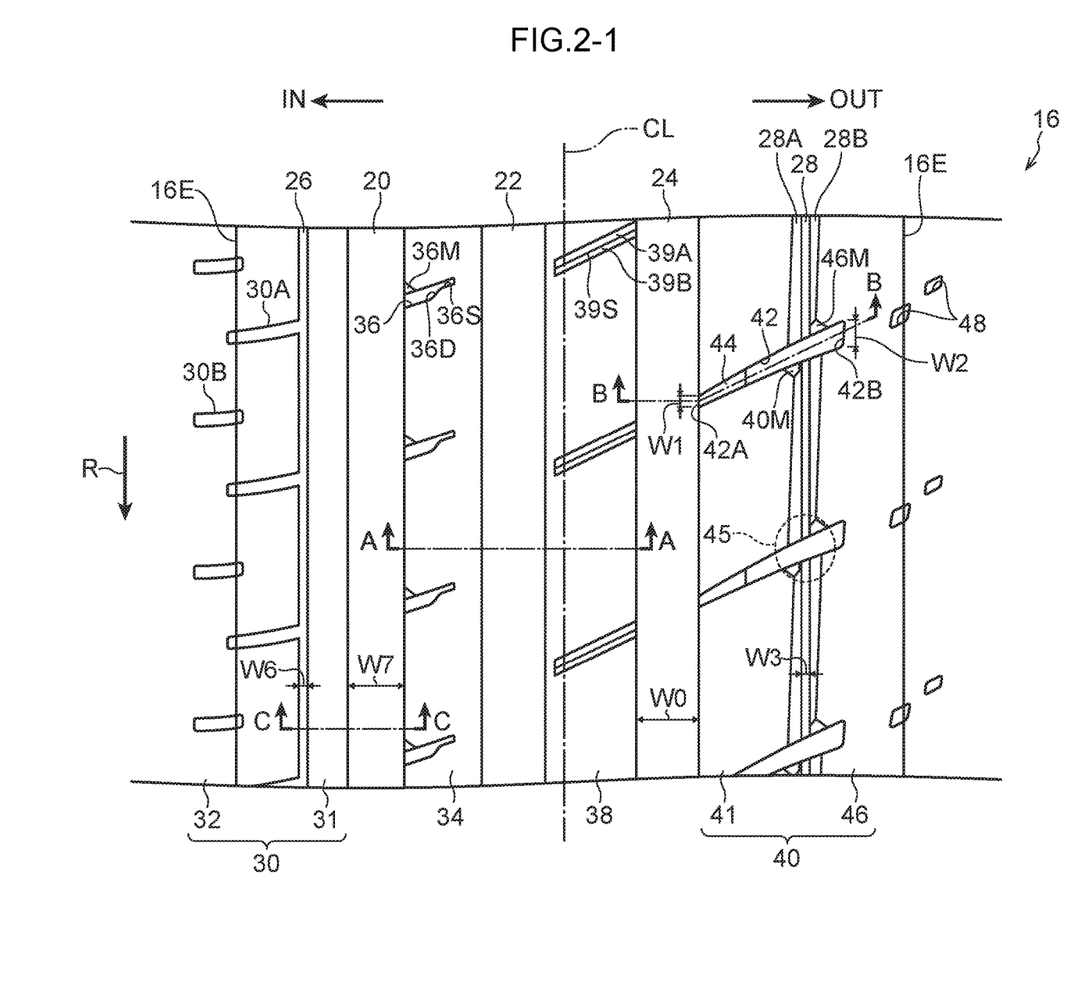

FIG. 2-1 illustrates the tread section 16 of the pneumatic tire 10. Tire ground contact edges 16E of the tread section 16 are the tire ground contact edges when the pneumatic tire 10 is fitted to a standard rim, as defined in the JATMA YEAR BOOK (2014 edition, Japan Automobile Tire Manufacturers Association standards), inflated to an internal pressure of 100% air pressure (maximum air pressure) corresponding to the maximum load capacity (load shown in bold in the internal pressure-load capacity correspondence table) for the applicable JATMA YEAR BOOK size/ply rating, and loaded to the maximum load capacity. In cases in which the location of use or manufacturing location falls under TRA standards or ETRTO standards, then the respective standards are adhered to.

The pneumatic tire 10 of the present exemplary embodiment is configured with a pattern shape that is asymmetrical to the left and right of the tire equatorial plane CL. The pneumatic tire 10 is fitted such that the left side in the drawings is on the fitted tire inner side, and the right side in the drawings is the fitted tire outer side. The pneumatic tire 10 is preferably fitted such that the tire rotation direction is the direction indicated by the arrow R (such that the lower side in the drawings is on a tread-in side, and the upper side in the drawings is on a kick-out side). The pneumatic tire 10 does not necessarily have to be fitted such that the tire rotation direction is the direction described above, and may be fitted with the front-rear direction reversed.

The tread section 16 of the pneumatic tire 10 of the present exemplary embodiment is formed with an innermost side circumferential direction main groove 20, a central circumferential direction main groove 22, and an outermost side circumferential direction main groove 24, serving as plural circumferential direction main grooves (three in the present exemplary embodiment) extending around a tire circumferential direction.

The innermost side circumferential direction main groove 20 is formed furthest to the fitted tire inner side out of the three circumferential direction main grooves. The central circumferential direction main groove 22 is formed further to the fitted tire outer side than the innermost side circumferential direction main groove 20, and further to the fitted tire inside than the tire equatorial plane CL. The outermost side circumferential direction main groove 24 is formed further to the fitted tire outer side than the central circumferential direction main groove 22, and further to the fitted tire outer side than the tire equatorial plane CL.

Figure 22:
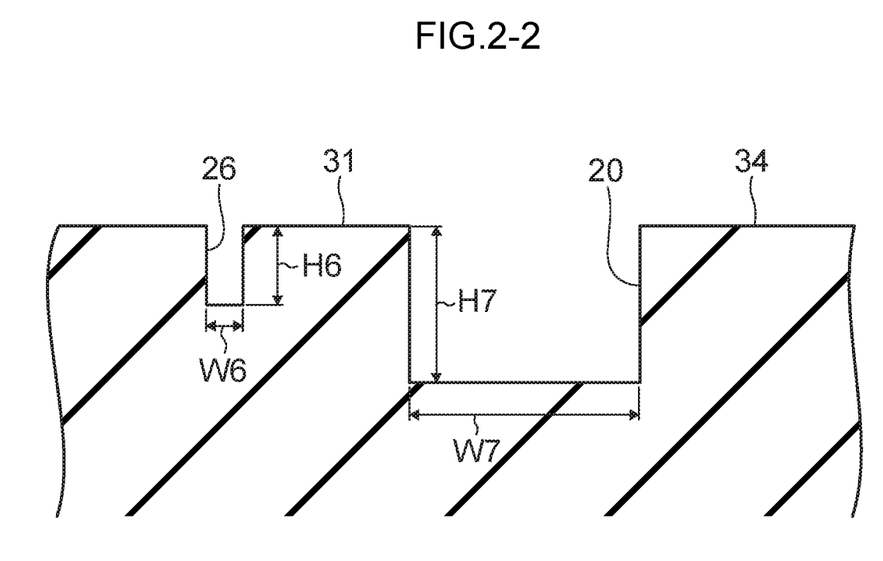

An inner side land portion 30 is formed at the fitted tire inner side of the innermost side circumferential direction main groove 20. The inner side land portion 30 is formed with an inner side circumferential direction fine groove 26 running along the tire circumferential direction. As also illustrated in FIG. 2-2, a groove width W6 of the inner side circumferential direction fine groove 26 is narrower than a groove width W7 of the innermost side circumferential direction main groove 20, and a groove depth H6 of the inner side circumferential direction fine groove 26 is shallower than a groove depth H7 of the innermost side circumferential direction main groove 20. The inner side circumferential direction fine groove 26 partitions the inner side land portion 30 into a first inner side land portion 31 on the side of the tire equatorial plane CL, and a second inner side land portion 32 on the side of a shoulder.

The inner side circumferential direction fine groove 26 differs from the circumferential direction main grooves in the point that it has a narrower groove width and has a shallower groove depth than the three circumferential direction main grooves (the innermost side circumferential direction main groove 20, the central circumferential direction main groove 22, and the outermost side circumferential direction main groove 24).

The second inner side land portion 32 is formed with inner side lug grooves 30A that open onto the inner side circumferential direction fine groove 26, and that extend in a tire width direction from the inner side circumferential direction fine groove 26 toward the side of the shoulder on the fitted tire inner side. The inner side lug grooves 30A extend further to the shoulder side than the tire ground contact edge 16E on the fitted tire inner side, and terminate within the second inner side land portion 32. The second inner side land portion 32 is also formed with shoulder lug grooves 30B that are disposed at a separation to the inner side circumferential direction fine groove 26, and that extend in the tire width direction. The shoulder lug grooves 30B extend from further to the tire equatorial plane CL side than the tire ground contact edge 16E so as to straddle the tire ground contact edge 16E and terminate further to the shoulder side than the inner side lug grooves 30A. Each of the shoulder lug grooves 30B is formed between two of the inner side lug grooves 30A in the tire circumferential direction. The inner side lug grooves 30A and the shoulder lug grooves 30B are disposed so as to be partially superimposed on each other (overlapping) as viewed along the tire circumferential direction.

The first inner side land portion 31 is not formed with grooves. The width of the first inner side land portion 31 is formed as a narrower width than the width of other ribs formed at the tread section 16.

Figure 3:
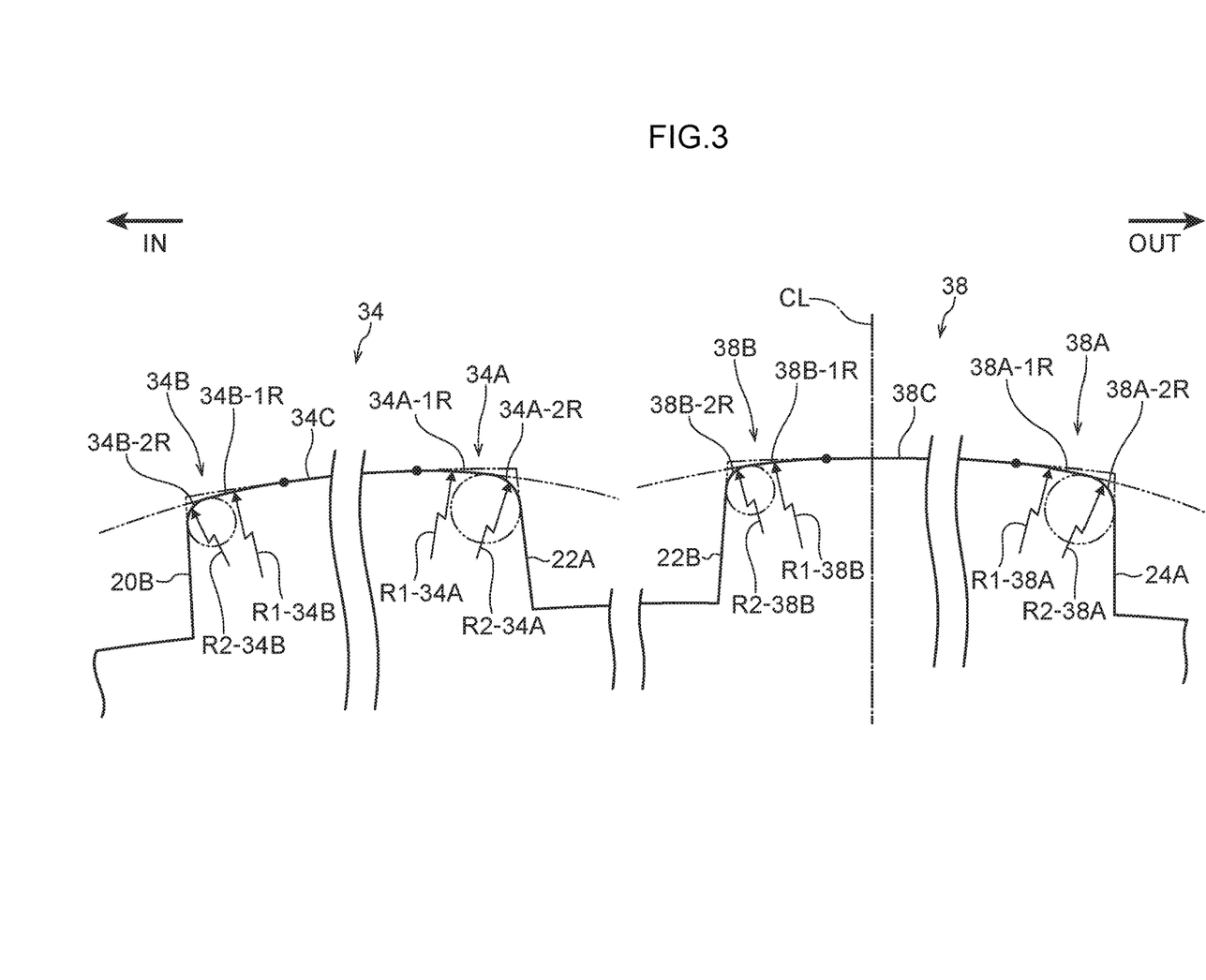
FIG. 3 is a partial cross-section taken along line A-A in FIG. 2-1.

A first rib 34 is formed between the innermost side circumferential direction main groove 20 and the central circumferential direction main groove 22. As illustrated in FIG. 3, both edges of the first rib 34 are formed by arc shaped faces. A fitted tire outer side edge of the first rib 34 configures a first outer edge 34A, and a fitted tire inner side edge of the first rib 34 configures a first inner edge 34B.

The first outer edge 34A is configured by a first arc shaped face 34A-1R on the side of a tread face 34C, and a second arc shaped face 34A-2R on the side of a groove wall 22A of the central circumferential direction main groove 22. The first arc shaped face 34A-1R is contiguous from the tread face 34C, and as viewed along the tire circumferential direction (in cross-section taken along the tire radial direction), the first arc shaped face 34A-1R is formed by part of a circular arc about a center within the first rib 34 and tangential to the tread face 34C. The second arc shaped face 34A-2R is contiguous from the first arc shaped face 34A-1R, and as viewed along the tire circumferential direction (in cross-section taken along the tire radial direction), the second arc shaped face 34A-2R is formed by part of a circular arc about a center within the first rib 34 and tangential to the first arc shaped face 34A-1R and the groove wall 22A. A radius of curvature R2-34A of the second arc shaped face 34A-2R is set smaller than a radius of curvature R1-34A of the first arc shaped face 34A-1R. The radius of curvature R1-34A of the first arc shaped face 34A-1R is preferably in a range of from 250 mm to 3800 mm, and the radius of curvature R2-34A of the second arc shaped face 34A-2R is preferably in a range of from 1 mm to 10 mm.

The first inner edge 34B is configured by a first arc shaped face 34B-1R on the side of the tread face 34C, and a second arc shaped face 34B-2R on the side of a groove wall 20B of the innermost side circumferential direction main groove 20. The first arc shaped face 34B-1R is contiguous from the tread face 34C, and as viewed along the tire circumferential direction (in cross-section taken along the tire radial direction), the first arc shaped face 34B-1R is formed by part of a circular arc about a center within the first rib 34 and tangential to the tread face 34C. The second arc shaped face 34B-2R is contiguous from the first arc shaped face 34B-1R, and as viewed along the tire circumferential direction (in cross-section taken along the tire radial direction), the second arc shaped face 34B-2R is formed by part of a circular arc about a center within the first rib 34, and tangential to first arc shaped face 34B-1R and the groove wall 20B. A radius of curvature R2-34B of the second arc shaped face 34B-2R is set smaller than a radius of curvature R1-34B of the first arc shaped face 34B-1R. The radius of curvature R1-34B of the first arc shaped face 34B-1R is preferably in a range of from 150 mm to 1500 mm, and the radius of curvature R2-34B of the second arc shaped face 34B-2R is preferably in a range of from 1 mm to 10 mm.

The radius of curvature R2-34A of the second arc shaped face 34A-2R is set to the radius of curvature R2-34B of the second arc shaped face 34B-2R or greater.

As illustrated in FIG. 2-1, the first rib 34 is formed with first lug grooves 36. The first lug grooves 36 open onto the innermost side circumferential direction main groove 20, and extend from the innermost side circumferential direction main groove 20 toward the side of the central circumferential direction main groove 22. The first lug grooves 36 do not open onto the central circumferential direction main groove 22, and terminate within the first rib 34. Accordingly, a side of the first rib 34 closer to the tire equatorial plane CL forms a continuous land portion in a straight line shape around the tire circumferential direction.

The first lug grooves 36 are at a slight angle with respect to the tire width direction. Out of corner portions formed between the innermost side circumferential direction main groove 20 and the first lug grooves 36, the corner portions on sides where acute angles are formed (the upper sides of the first lug grooves 36 in FIG. 2-1) are chamfered to form chamfered portions 36M. Each of the first lug grooves 36 is configured with a leading end portion 36S at a central circumferential direction main groove 22 side where the groove width is narrower than at an innermost side circumferential direction main groove 20 side. The leading end portion 36S is formed with a narrower width by forming a rounded step portion 36D to the groove wall on the side that is not formed with the chamfered portion 36M. The rounded step portion 36D has a smooth rounded shape at a corner portion connected to the leading end portion 36S. Groove bottoms of the first lug grooves 36 are deepest at the innermost side circumferential direction main groove 20 side, and become gradually shallower on progression toward the leading end portion 36S side.

A second rib 38 is formed between the central circumferential direction main groove 22 and the outermost side circumferential direction main groove 24. The tire equatorial plane CL is disposed over the second rib 38, toward the side of the central circumferential direction main groove 22. As illustrated in FIG. 3, both edges of the second rib 38 are formed by arc shaped faces. A fitted tire outer side edge of the second rib 38 configures a second outer edge 38A, and a fitted tire inner side edge of the second rib 38 configures a second inner edge 38B.

The second outer edge 38A is configured by a first arc shaped face 38A-1R on the side of a tread face 38C, and a second arc shaped face 38A-2R on the side of a groove wall 24A of the outermost side circumferential direction main groove 24. The first arc shaped face 38A-1R is contiguous from the tread face 38C, and as viewed along the tire circumferential direction (in cross-section taken along the tire radial direction), the first arc shaped face 38A-1R is formed by part of a circular arc about a center within the second rib 38 and tangential to the tread face 38C. The second arc shaped face 38A-2R is contiguous from the first arc shaped face 38A-1R, and as viewed along the tire circumferential direction (in cross-section taken along the tire radial direction), the second arc shaped face 38A-2R is formed by part of a circular arc about a center within the second rib 38 and tangential to the first arc shaped face 38A-1R and the groove wall 24A. A radius of curvature R2-38A of the second arc shaped face 38A-2R is set smaller than a radius of curvature R1-38A of the first arc shaped face 38A-1R. The radius of curvature R1-38A of the first arc shaped face 38A-1R is preferably in a range of from 250 mm to 3800 mm, and the radius of curvature R2-38A of the second arc shaped face 38A-2R is preferably in a range of from 1 mm to 10 mm.

The second inner edge 38B is configured by a first arc shaped face 38B-1R on the side of the tread face 38C, and a second arc shaped face 38B-2R on the side of a groove wall 22B of the central circumferential direction main groove 22. The first arc shaped face 38B-1R is contiguous from the tread face 38C, and as viewed along the tire circumferential direction (in cross-section taken along the tire radial direction), the first arc shaped face 38B-1R is formed by part of a circular arc about a center within the second rib 38 and tangential to the tread face 38C. The second arc shaped face 38B-2R is contiguous from the first arc shaped face 38B-1R, and as viewed along the tire circumferential direction (in cross-section taken along the tire radial direction), the second arc shaped face 38B-2R is formed by part of a circular arc about a center within the second rib 38 and tangential to the first arc shaped face 38B-1R and the groove wall 22B. A radius of curvature R2-38B of the second arc shaped face 38B-2R is set smaller than a radius of curvature R1-38B of the first arc shaped face 38B-1R. The radius of curvature R1-38B of the first arc shaped face 38B-1R is preferably in a range of from 250 mm to 3800 mm, and the radius of curvature R2-38B of the second arc shaped face 38B-2R is preferably in a range of from 1 mm to 10 mm.

The radius of curvature R2-38A of the second arc shaped face 38A-2R is set to the radius of curvature R2-38B of the second arc shaped face 38B-2R or greater.

The second rib 38 is formed with sipes 39S. The sipes 39S open onto the outermost side circumferential direction main groove 24, and extend from the outermost side circumferential direction main groove 24 toward the side of the central circumferential direction main groove 22. The sipes 39S have a groove width that closes up when in contact with the ground. Groove walls configuring the sipes 39S are chamfered along the sipes 39S at upper portions of the groove walls, thereby forming chamfered portions 39A, 39B. The sipes 39S do not open onto the central circumferential direction main groove 22, and terminate inside the second rib 38. Accordingly, a side edge portion of the second rib 38 on the side closer to the tire equatorial plane CL forms a continuous land portion in a straight line shape around the tire circumferential direction.

Figure 5:
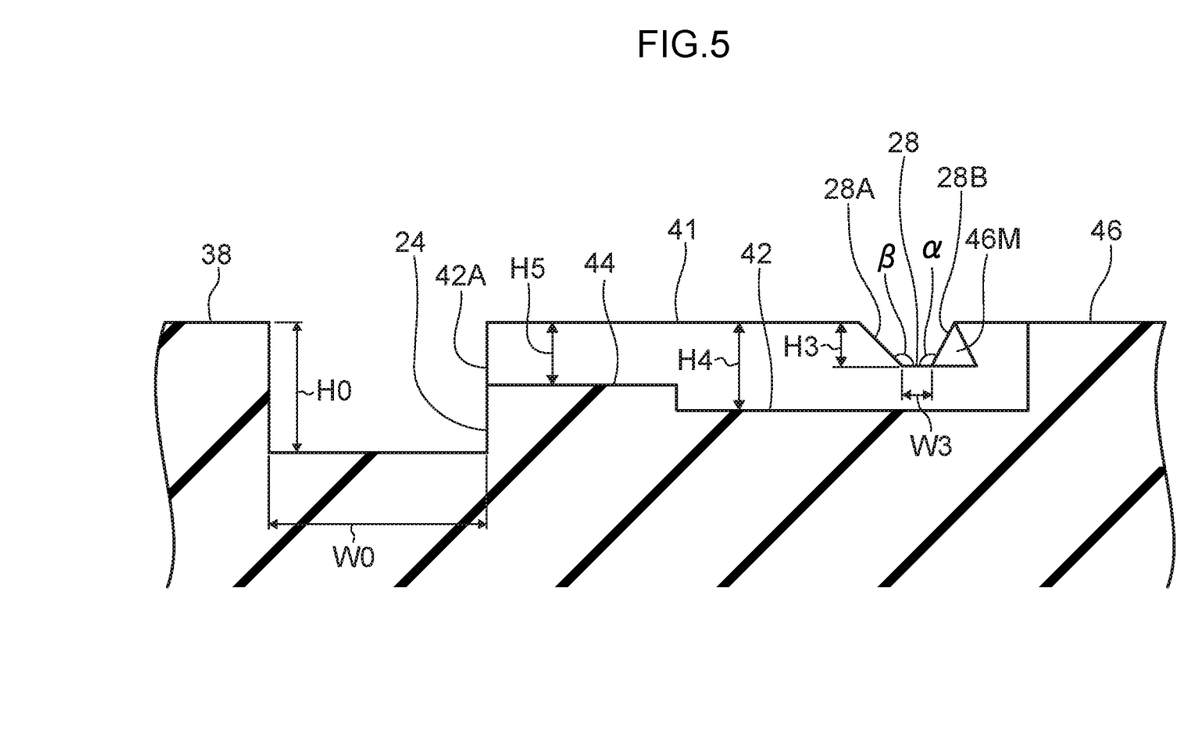
FIG. 5 is a cross-section taken along line B-B in FIG. 2-1.

An outer side land portion 40 is formed further to the fitted tire outer side than the outermost side circumferential direction main groove 24. The outer side land portion 40 is formed with a shoulder circumferential direction fine groove 28 running around the tire circumferential direction. The shoulder circumferential direction fine groove 28 partitions the outer side land portion 40 into a first outer side land portion 41 on the side of the tire equatorial plane CL, and a second outer side land portion 46 on the side of the shoulder. A groove width W3 at the groove bottom of the shoulder circumferential direction fine groove 28 is formed narrower than a groove width W0 of the outermost side circumferential direction main groove 24. As illustrated in FIG. 5, a groove depth H3 of the shoulder circumferential direction fine groove 28 is formed shallower than a groove depth H0 of the outermost side circumferential direction main groove 24. Groove walls 28A, 28B configuring the shoulder circumferential direction fine groove 28 each form an angle of greater than 90° with respect to the groove bottom. Accordingly, the shoulder circumferential direction fine groove 28 becomes wider on progression from the groove bottom toward the tread face. A wall face angle β of the groove wall 28A (the angle between the groove bottom and the groove wall 28A, see FIG. 5) is larger on the tread-in side than on the kick-out side, as illustrated in FIG. 2-1, and a ridge line between the first outer side land portion 41 and the groove wall 28A is inclined toward the tire width direction outer side on progression from the tread-in side toward the kick-out side. A wall face angle α (see FIG. 3) of the groove wall 28B is larger on the kick-out side than on the tread-in side, and a ridge line between the second outer side land portion 46 and the groove wall 28B is inclined toward the tire width direction outer side on progression from the tread-in side toward the kick-out side.

The shoulder circumferential direction fine groove 28 also differs from the circumferential direction main grooves in the point that it has a narrower groove width and has a shallower groove depth than the three circumferential direction main grooves (the innermost side circumferential direction main groove 20, the central circumferential direction main groove 22, and the outermost side circumferential direction main groove 24).

The first outer side land portion 41 is formed with outer side lug grooves 42 extending from the outermost side circumferential direction main groove 24 toward the fitted tire outer side. Each of the outer side lug grooves 42 is configured in a straight line shape, and opens onto the outermost side circumferential direction main groove 24 at one end 42A. The outer side lug grooves 42 cross over the shoulder circumferential direction fine groove 28, and the other ends (the other ends are referred to below as the "terminal portions 42B") extend into the second outer side land portion 46. The one ends 42A of the outer side lug grooves 42 are disposed on an extension of the sipes 39S. Moreover, the outer side lug grooves 42 run in the same direction and at the same angle as the sipes 39S, thereby configuring a design in which the outer side lug grooves 42 continue from the sipes 39S through the outermost side circumferential direction main groove 24.

The outer side lug grooves 42 intersect the shoulder circumferential direction fine groove 28 and terminate at the terminal portions 42B within the second outer side land portion 46. The terminal portions 42B are disposed further toward the side of the tire equatorial plane CL than the tire ground contact edge 16E on the fitted tire outer side. Moreover, the terminal portions 42B terminate further toward the side of the outermost side circumferential direction main groove 24 than a tire width direction outer side edge of the belt layers 19. The second outer side land portion 46 includes a continuous land portion in a straight line shape around the circumferential direction. As illustrated in FIG. 2-1, the narrowest groove width W1 of the outer side lug grooves 42 is configured at the one end 42A, this being a portion opening onto the outermost side circumferential direction main groove 24, and the broadest groove width W2 of the outer side lug grooves 42 is configured at the terminal portion 42B within the second outer side land portion 46. The outer side lug grooves 42 are formed so as to gradually increase in width on progression from the one ends 42A toward the terminal portions 42B.

As illustrated in FIG. 5, a groove depth H4 of the outer side lug grooves 42 is shallower than the groove depth H0 of the outermost side circumferential direction main groove 24, and is deeper than the groove depth H3 of the shoulder circumferential direction fine groove 28. Intersections 45 where the outer side lug grooves 42 intersect with the shoulder circumferential direction fine groove 28 (see FIG. 2-1) are configured at the groove depth H4. Accordingly, the groove bottom of the shoulder circumferential direction fine groove 28 is deeper at the intersections 45 than it is at other portions of the shoulder circumferential direction fine groove 28. Note that in FIG. 5, the ground contact face of the tire is schematically illustrated as a flat face in order to facilitate comparison of the groove depths.

As illustrated in FIG. 5, a groove bottom upper portion 44 with a raised groove bottom is formed at the one end 42A side of the outer side lug grooves 42. The groove depth of the groove bottom upper portion 44 is shallower than the groove depth H4 of the outer side lug grooves 42. The groove bottom upper portion 44 is formed from the one end 42A to the vicinity of the center of the first outer side land portion 41.

In the first outer side land portion 41 and the second outer side land portion 46, out of corner portions of the intersections 45 formed between the outer side lug grooves 42 and the shoulder circumferential direction fine groove 28, respective chamfered portions 40M, 46M are formed at the sides forming acute angles.

First recesses 48A and second recesses 48B are formed further to the tire width direction outer side than the outer side lug grooves 42 of the second outer side land portion 46. At least a portion of each first recess 48A is formed over the tire ground contact edge 16E on an extension of the outer side lug groove 42 to the tire width direction outer side. At least a portion of each second recess 48B is disposed on the extension of the outer side lug groove 42 further to the tire width direction outer side than the tire ground contact edge 16E, and is disposed on a side farther away from the outer side lug grooves 42. The first recesses 48A and the second recesses 48B are parallelogram shaped. The first recesses 48A are larger than the second recesses 48B in plan view, and have a greater depth than the second recesses 48B. The second recesses 48B are disposed at a position where the distance from an edge portion of the first belt layer 19A is at its minimum.

The first recesses 48A and the second recesses 48B enable a wear state of the second outer side land portion 46 to be ascertained separately to normal wear indicators provided to the tire circumferential direction main grooves.

The first recesses 48A and the second recesses 48B differ from the grooves formed at the tire tread in the point that they do not have a water dispelling function. Both the first recesses 48A and the second recesses 48B have a diagonal line ratio (short side/long side) set to ½ or lower.

Next, explanation follows regarding operation of the pneumatic tire 10 of the present exemplary embodiment.

In the pneumatic tire 10 of the present exemplary embodiment, the tread section 16 is formed with the innermost side circumferential direction main groove 20, the central circumferential direction main groove 22, and the outermost side circumferential direction main groove 24, thereby securing basic water dispelling performance, as well as stability when driving straight ahead in both wet and dry conditions.

In the tread section 16 of the pneumatic tire 10 of the present exemplary embodiment, the second outer side land portion 46 is disposed as a continuous land portion configured around the tire circumferential direction at the fitted tire outer side. This thereby enables rigidity to be secured at the fitted tire outer side, and enables improved cornering performance.

In the present exemplary embodiment, the first outer edge 34A and the second outer edge 38A disposed at the fitted tire outer side of the first rib 34 and the second rib 38 respectively are formed with the first arc shaped face 34A-1R and the second arc shaped face 34A-2R, and the first arc shaped face 38A-1R and the second arc shaped face 38A-2R. This thereby enables the volume of the first rib 34 and the second rib 38 on the fitted tire outer side to be reduced, and enables ground contact load to be suppressed from concentrating at the first outer edge 34A and the second outer edge 38A when cornering.

In the present exemplary embodiment, the first inner edge 34B and the second inner edge 38B disposed on the fitted tire inner side of the first rib 34 and the second rib 38 are respectively formed with the first arc shaped face 34B-1R and the second arc shaped face 34B-2R, and the first arc shaped face 38B-1R and the second arc shaped face 38B-2R. This thereby enables a concentration of load on the first inner edge 34B and the second inner edge 38B to be suppressed when driving straight ahead or when turning with light steering.

In the present exemplary embodiment, the radius of curvature R2-34B and R2-38B of the second arc shaped faces 34B-2R, 38B-2R on the fitted tire inner side are respectively the R2-34A and the R2-38A, or lower. Accordingly, the first outer edge 34A and the second outer edge 38A on the fitted tire outer side, where a larger load is input when cornering, have the volume of the first inner edge 34B and the second inner edge 38B on the fitted tire inner side, or lower. This thereby enables a drop-off amount to be made comparatively large on the fitted tire outer side, where a larger load is input when cornering, thereby enabling uneven balance of ground contact pressure in the first rib 34 and the second rib 38 to be suppressed.

In the present exemplary embodiment, the second arc shaped faces 34B-2R, 38B-2R are formed at the fitted tire inner side of the first rib 34 and the second rib 38 respectively. However the second arc shaped faces 34B-2R, 38B-2R are not an absolute requirement, and the first arc shaped faces 34B-1R, 38B-1R may be formed alone.

Figure 4:
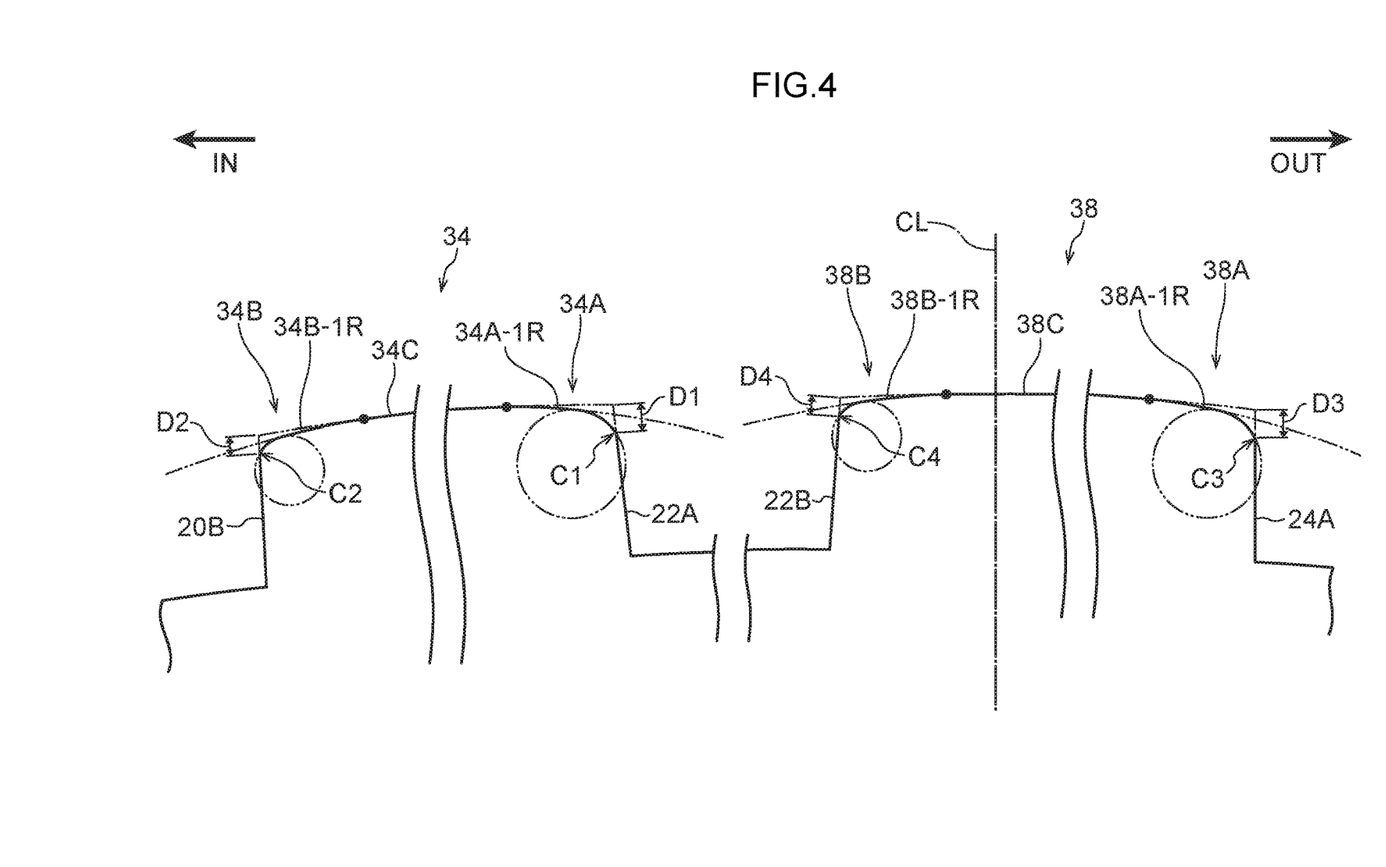
FIG. 4 is a partial cross-section of a pneumatic tire according to a modified example of the present exemplary embodiment.

In the present exemplary embodiment, the second arc shaped faces 34A-2R, 38A-2R on the fitted tire outer side, and the second arc shaped faces 34B-2R, 38B-2R on the fitted tire inner side are each formed by part of a circular arc tangential to the adjacent first arc shaped faces and groove walls. However, the second arc shaped faces 34A-2R, 38A-2R on the fitted tire outer side, and the second arc shaped faces 34B-2R, 38B-2R on the fitted tire inner side do not necessarily have to be parts of circular arcs tangential to both the first arc shaped faces and the groove walls. As illustrated in FIG. 4, they may be formed so as to be tangential to the adjacent first arc shaped faces, and intersect the groove walls. In such cases, the drop-off amounts may be set as the distances from the adjacent tread face to intersection points C1 to C4 with the respective groove walls. For example, in FIG. 4, the tire radial direction drop-off amounts of the second arc shaped faces 34A-2R, 38A-2R, 34B-2R, 38B-2R are set to D1, D2, D3, and D4 respectively. In such a configuration, the drop-off amounts D1, D3 on the fitted tire outer side are preferably the drop-off amounts D2, D4 on the fitted tire inner side or greater in the first rib 34 and the second rib 38 respectively. Setting the drop-off amounts in this manner enables the volumes of the first outer edge 34A and the second outer edge 38A to be made smaller than the volumes at the fitted tire inner side. This thereby enables ground contact load to be suppressed from concentrating at the first outer edge 34A and the second outer edge 38A when cornering, and enables uneven balance of ground contact pressure in the first rib 34 and the second rib 38 to be suppressed.

In the present exemplary embodiment, the respective radius of curvature of the first arc shaped faces 34A-1R, 34B-1R, 38A-1R, 38B-1R and the second arc shaped faces 34A-2R, 34B-2R, 38A-2R, 38B-2R are uniform in the respective arc shaped faces. However, configuration may be made in which the respective radius of curvature change in the respective arc shaped faces, for example such that the radius of curvature gradually increase or gradually decrease.

EXAMPLE

As examples of the pneumatic tire 10 of the present exemplary embodiment, the values in Table 1 below may be applied for the first arc shaped faces, and the values in Table 2 below may be applied for the second arc shaped faces (R being the radius of curvature, and D being the tire radial direction drop-off amount).

TABLE 1

|  | Example 1 | Example 2 | Example 3 |
|---|---|---|---|
| 34A-1R | D = 0.2 mm | D = 0.2 mm | D = 0.6 mm |
| 34B-1R | D = 0.4 mm | D = 0.2 mm | D = 0.2 mm |
| 38A-1R | D = 0.3 mm | D = 0.2 mm | D = 0.6 mm |
| 38B-1R | D = 0.4 mm | D = 0.2 mm | D = 0.6 mm |

TABLE 2

|  | Example 4 | Example 5 | Example 6 |
|---|---|---|---|
| 34A-1R | R = 3 mm | R = 9 mm<br>D = 0.7 mm | R = 3 mm |
| 34B-1R | R = 2 mm | R = 9 mm<br>D = 0.5 mm | R = N/A |
| 38A-1R | R = 3 mm | R = 9 mm<br>D = 0.8 mm | R = 3 mm |
| 38B-1R | R = 1.8 to 2 mm | R = 9 mm<br>D = 0.8 mm | R = N/A |

The invention claimed is:

1. A pneumatic tire, comprising:

a plurality of circumferential direction main grooves that are formed at a tread section and that extend around a tire circumferential direction;

a plurality of land portions that are formed between the plurality of circumferential direction main grooves;

first center arc shaped faces that are formed at both tire width direction edges of a first land portion, and that have an arc shape about a center within the first land portion as viewed in a tire radial direction cross-section;

a first outer arc shaped face that is an edge on a fitter tire outer side of the first land portion, that is formed continuously from the first center arc shaped face toward a tire width direction outer side of the first land portion and toward a groove bottom, and that has an arc shape, about a center within the first land portion as viewed in the tire radial direction cross-section, having a smaller radius of curvature than the first center arc shaped face;

a first inner arc shaped face that is formed at a fitted tire inner side of the first land portion so as to be continuous from the first center arc shaped face toward the tire width direction inner side of the first land portion and toward a groove bottom, and having an arc shape about a center within the first land portion as viewed in the tire radial direction cross-section;

second center arc shaped faces that are formed at both tire width direction edges of a second land portion, and that have an arc shape about a center within the second land portion as viewed in a tire radial direction cross-section;

a second outer arc shaped face that is formed at an edge on a fitted tire outer side of the second land portion, that is formed continuously from the second center arc shaped face toward a tire width direction outer side of the second land portion and toward a groove bottom, and that has an arc shape, about a center within the second land portion as viewed in the tire radial direction cross-section, having a smaller radius of curvature than the second center arc shaped face;

a second inner arc shaped face that is formed at a fitted tire inner side of the second land portion so as to be continuous from the second center arc shaped face toward the tire width direction inner side of the second land portion and toward a groove bottom, and having an arc shape about a center within the second land portion as viewed in the tire radial direction cross-section; wherein as viewed in a single plane in the tire radial direction cross-section;

a radius of curvature of the first inner arc shaped face is smaller than a radius of curvature of the first outer arc shaped face;

a radius of curvature of the second inner arc shaped face is smaller than a radius of curvature of the second outer arc shaped face; and a radius of curvature of the first center arc shaped face is no larger than a radius of curvature of the second center arc shaped face.

2. The pneumatic tire of claim 1, wherein a tire radial direction drop-off amount from a tread face of the first land portion to a lower end of the first outer arc shaped face is greater than or equal to a tire radial direction drop-off amount from the tread face of the first land portion to a lower end of the first inner arc shaped face, or a tire radial direction drop-off amount from a tread face of the second land portion to a lower end of the second outer arc shaped face is greater than or equal to a tire radial direction drop-off amount from the tread face of the second land portion to a lower end of the second inner arc shaped face.

* * * * *